United States Patent Office 2,899,267
Patented Aug. 11, 1959

2,899,267
PROCESS FOR PURIFYING AIR

Franz Berndt, Kassel-B., and Hans-Georg Wendlandt, Kassel, Germany, assignors to Spinnfaser Aktiengesellschaft, Kassel-Bettenhausen, Germany No Drawing. Application March 23, 1956
Serial No. 573,341

Claims priority, application Germany March 24, 1955

2 Claims. (Cl. 23—4)

This invention relates to a process for removing hydrogen sulfide from air.

Bog iron ore has been employed for the removal of hydrogen sulfide from gases. In such uses the general intent is to reduce the hydrogen sulfide content of the gases to a minimum without, at the same time, introducing too great a quantity of air into the gases, the air being introduced to convert the iron sulfide formed to sulfur. Since the concentration of hydrogen sulfide in the gases to be purified is ordinarily relatively high, it is not necessary to use a very great gas-flow speed. However, the removal of hydrogen sulfide from the effluent air of viscose plants presents a more than ordinary problem since the concentration of hydrogen sulfide in such air is generally very small and the oxygen content is relatively large. Any process for removing hydrogen sulfide from such air must employ a very rapid gas throughput if it is to be economical.

Attempts have been made to adapt processes for removing hydrogen sulfide used in the fuel gas industry to the viscose industry. In these processes the gas to be purified is passed through a loose bed of iron hydroxide contact material at a throughput speed of at least 1.5 centimeters per second. However, the high throughput speeds which would be required to adapt these processes to the viscose industry would render them inoperable since at such high speeds the loose contact material would be blown out of the reaction towers.

Wet oxidation processes have also been employed in gas purification for the removal of hydrogen sulfide, particularly processes employing alkaline iron hydroxide suspensions as the purifying contact material. In all of these processes two distinct steps are employed. In the first step the hydrogen sulfide is reacted with the iron hydroxide to form iron sulfide, and in the second step air is employed to oxidize the iron sulfide to sulfur. This two-step process is not suitable for the viscose industry because of the large volumes of effluent air which must be purified. Any economically successful process for the viscose industry must be one employing only a single step to react the hydrogen sulfide with the iron and simultaneously oxidize the formed iron sulfide with oxygen already present in the effluent air.

Attempts have been made to modify the wet oxidation processes employing alkaline iron hydroxide suspensions so as to obtain a continuous process. To this end frothing agents have been added to the iron hydroxide suspensions in order to produce a froth and thereby increase the surface area of the iron hydroxide suspension. By this means it is possible to react the hydrogen sulfide with the iron hydroxide and to regenerate the adsorbent iron hydroxide with oxygen. However, these processes are unsatisfactory for purifying the relatively large volumes of effluent air produced by viscose plants. The amount of froth required would make the process cumbersome. Furthermore, since the frothing agents employed are volatile compounds, the air would become contaminated with these compounds and be detrimental to later processing of the air. The effluent air from viscose plants also contains carbon disulfide which must, of course, be recovered. If this air becomes contaminated with a frothing agent, the contaminant would be carried over into the recovered carbon disulfide and thereby render it unsatisfactory for further use.

Accordingly, any process for removing hydrogen sulfide from the effluent air obtained from viscose plants must be suitable from the standpoint of not being detrimental to the recovery of the carbon disulfide also present in the effluent air. A somewhat successful process has been developed in which manganese oxide or hydroxide has been added to the iron hydroxide suspension to catalyze the reaction. However, for economic reasons the addition of a catalyst is disadvantageous.

One of the objects of this invention is to provide a process for removing hydrogen sulfide from gases which is operable on gases containing a small amount of hydrogen sulfide and a relatively large amount of oxygen.

Another object of the invention is to provide a process for removing hydrogen sulfide from air in which process the hydrogen sulfide is adsorbed and converted to sulfur in a single process step.

A further object of the invention is to provide a process for removing hydrogen sulfide from effluent air obtained from viscose plants, which process does not require the use of frothing agents or other substances detrimental to later processing operations.

Another object of the invention is to provide a process for removing hydrogen sulfide from effluent air obtained from viscose plants, which process will not be detrimental to later processing of the air to remove carbon disulfide.

In accordance with the invention, these objects are accomplished by a process in which the air to be purified is passed through an alkaline iron hydroxide suspension at a flow speed of at least 30 centimeters per second. The alkaline iron hydroxide suspension must be present in sufficient amount to provide at least 7.5 moles of ferric hydroxide per mole of hydrogen sulfide, preferably at least 20 moles of ferric hydroxide per mole of hydrogen sulfide.

By the process of the invention the hydrogen sulfide is converted to iron sulfide and the iron sulfide oxidized to produce sulfur in a single process step in which the following two reactions occur:

$$4Fe(OH)_3 + 6H_2S \rightarrow 2Fe_2S_3 + 12H_2O$$
$$2Fe_2S_3 + 3O_2 + 6H_2O \rightarrow 4Fe(OH)_3 + 3S_2$$

Although the above two reactions differ considerably in their reaction speeds, they must be effected simultaneously in the reaction vessel in order that the hydrogen sulfide be completely converted to sulfur.

The maximum limit on the throughput speed of the effluent air in the reaction vessel is, of course, governed by the minimum residence time required. The residence time in turn is dependent on the concentration of hydrogen sulfide in the air. Generally, the $H_2S$ content of the effluent air resulting from viscose manufacture amounts to about 0.8 gram to about 1 gram $H_2S$ per cubic meter of air. In purifying air having such a concentration of $H_2S$, the residence time must not be less than 5 seconds, and where standard reaction vessels of 75 to 150 cubic meters capacity are employed, this residence time would be obtained with a throughput speed of about 170 centimeters per second. Accordingly, for such small concentrations of $H_2S$ it is preferable to employ a throughput speed of at least 150 centimeters per second. In certain viscose manufacturing operations the concentration of $H_2S$ and $CS_2$ will become larger, the former concentration being as much as 15 grams $H_2S$ per cubic meter. In this case the air can be purified employing a residence time of about 32 seconds and a throughput speed of about 30 centimeters per second when the same standard reaction vessel is employed. Care must be taken that the $CS_2/O_2$ ratio remain below an explosive proportion.

The iron hydroxide employed according to the invention is preferably obtained by precipitation with lime from $FeSO_4.7H_2O$. Its concentration in the aqueous suspending solution should preferably be between 2 to 5% by weight as $Fe(OH)_3$. The alkalinity of the suspension is preferably adjusted to more than 0.2% $Na_2CO_3$. At lower alkalinities the speed of washing out is reduced to such a degree that the throughput speed must also be considerably reduced. The temperature of the suspension should be at least 15° C., preferably 30–40° C.

By the invention the two aforementioned reactions are controlled in such a manner that loss of sulfur due to side reactions in which $Na_2S_2O_3$ results is largely avoided. In prior processes in which alkaline iron hydroxide suspensions were employed, sulfur losses due to side reactions amounted to as much as 22% of the sulfur originally present as $H_2S$. Furthermore, for every gram of $H_2S$ about 0.8 gram $Na_2CO_3$ were required. By the invention the $H_2S$ content of the effluent air from viscose plants may be reduced to as little as 2 milligrams per cubic meter, the loss of sulfur due to side reactions can be reduced to 12%, and the consumption of $Na_2CO_3$ can be reduced 0.25 gram per gram of $H_2S$.

The reaction vessel employed in the invention may be any conventional type of gas scrubber such as a packed tower or bubble-cap tower. In addition to the scrubber, means should preferably be provided for the recirculation of the suspension. The sulfur formed by the purification process is removed from the iron hydroxide suspension by flotation after which the recovered sulfur may be dried in a suction cell filter and then reprocessed.

The invention will be further illustrated but is not limited by the following examples in which the quantities are stated in parts by weight unless otherwise indicated:

*Example 1*

Moisture saturated effluent air having a temperature of 30° C. and containing about 2 grams $H_2S$ per cubic meter was treated in a gas scrubber with an aqueous suspension containing 2% $Fe(OH)_3$ and 0.4% $N_2CO_3$. Sufficient suspension was introduced to the scrubber to make available about 29 moles $Fe(OH)_3$ per mole $H_2S$. The effluent air was passed through the scrubber at a flow speed of 70 centimeters per second which amounted to a residence time of about 13 seconds. The resulting purified air was found to contain only 2 milligrams $H_2S$ per cubic meter. The loss of sulfur due to side reactions was only 10%. The consumption of $Na_2CO_3$ was 0.1 gram per gram $H_2S$.

*Example 2*

Moisture saturated effluent air having a temperature of 30° C. and containing 8 grams $H_2S$ per cubic meter was treated in a gas scrubber with an aqueous suspension containing 4.1% $Fe(OH)_3$ and 0.5% $Na_2CO_3$. Sufficient suspension was introduced to the scrubber to make available about 39 moles $Fe(OH)_3$ per mole $H_2S$. The effluent air was passed through the scrubber at a flow speed of 40 centimeters per second which amounted to a residence time of about 25 seconds. The resulting purified air was found to contain only 2 milligrams $H_2S$ per cubic meter. The sulfur produced by the purification reaction was removed from the aqueous suspension by flotation. The loss of sulfur due to side reactions was only 12%. About 0.25 gram $Na_2CO_3$ was required per gram of $H_2S$.

To demonstrate the importance of having a sufficient proportion of ferric hydroxide available for a given amount of hydrogen sulfide, effluent air equivalent to that treated in Example 2 was treated in the same gas scrubber with an aqueous suspension containing 3.5% $Fe(OH)_3$ and 0.4% $Na_2CO_3$. Sufficient suspension was introduced to the scrubber to make available about 5.5 moles $Fe(OH)_3$ per mole $H_2S$. The effluent air was passed through the scrubber at the same flow speed as employed in Example 2 and thus also providing the same residence time. The resulting treated air was found to contain 195 milligrams $H_2S$ per cubic meter. The sulfur produced by the purification reaction was removed from the aqueous suspension by flotation. The loss of sulfur due to side reactions was 42%. About 0.58 gram sodium carbonate was required per gram of $H_2S$.

In Examples 1 and 2 effluent air contaminated with hydrogen sulfide (in one case 8 grams per cubic meter and in the other case 2 grams per cubic meter) was purified by the process of the invention to yield purified air of only 2 milligrams $H_2S$ per cubic meter. Thus, the process is effective in removing hydrogen sulfide contamination of both high and low concentrations. The entire process is accomplished in a single step and no side effects are produced which would be detrimental to later processing of the air such as the removal of the entrained carbon disulfide. Furthermore, the process is particularly economical in that sulfur losses due to side reactions are kept to a minimum.

The invention is hereby claimed as follows:

1. A process for purifying air of hydrogen sulfide comprising removing substantially all of the hydrogen sulfide from the air by passing air containing hydrogen sulfide at a flow speed of at least 30 centimeters per second through a gas scrubber containing an alkaline, aqueous, 2–5% by weight ferric hydroxide suspension having an alkalinity equivalent to more than 0.2% sodium carbonate, with a gas residence time in said scrubber of at least five seconds, the ferric hydroxide being present in said scrubber in an amount sufficient to make available for reaction with the hydrogen sulfide at least 20 moles ferric hydroxide per mol of hydrogen sulfide in said scrubber.

2. A process for purifying effluent air containing hydrogen sulfide from viscose manufacture which comprises removing substantially all of the hydrogen sulfide from said effluent air by passing said effluent air containing about 0.8–1 gram of hydrogen sulfide per cubic meter of air at a flow speed of at least 150 centimeters per second through a gas scrubber containing an alkaline, aqueous, 2–5% by weight ferric hydroxide suspension having an alkalinity equivalent to more than 0.2% sodium carbonate with a gas residence time in said scrubber of at least five seconds, the ferric hydroxide being present in said scrubber in an amount sufficient to provide at least 20 moles of ferric hydroxide per mol of hydrogen sulfide in said scrubber.

References Cited in the file of this patent

UNITED STATES PATENTS

| | | |
|---|---|---|
| 2,019,468 | Bacon | Oct. 29, 1935 |

FOREIGN PATENTS

| | | |
|---|---|---|
| 519,274 | Great Britain | Mar. 20, 1940 |
| 676,736 | Great Britain | July 30, 1952 |